(12) United States Patent
Kawazoe

(10) Patent No.: US 9,441,589 B2
(45) Date of Patent: Sep. 13, 2016

(54) FUEL INJECTOR

(71) Applicant: AISAN KOGYO KABUSHIKI KAISHA, Aichi-ken (JP)

(72) Inventor: Hiroshi Kawazoe, Aichi-ken (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 0 days.

(21) Appl. No.: 14/554,533

(22) Filed: Nov. 26, 2014

(65) Prior Publication Data
US 2015/0152828 A1 Jun. 4, 2015

(30) Foreign Application Priority Data
Nov. 29, 2013 (JP) .................................. 2013-247264

(51) Int. Cl.
*F02M 51/06* (2006.01)
*F02M 61/18* (2006.01)

(52) U.S. Cl.
CPC ..... *F02M 51/0667* (2013.01); *F02M 61/1873* (2013.01); *F02M 61/1886* (2013.01); *F02M 61/1893* (2013.01); *F02M 2200/02* (2013.01); *F02M 2200/16* (2013.01)

(58) Field of Classification Search
CPC ........... F02M 51/061; F02M 51/0625; F02M 51/0664; F02M 51/0671; F02M 51/0675; F02M 51/0682; F02M 61/18; F02M 61/1806; F02M 61/1853; F02M 61/1873; F02M 61/1886; F02M 61/1893; F02M 51/06; F02M 51/0667; F02M 2200/02; F02M 2200/16
USPC ........................................... 239/585.1–585.5
See application file for complete search history.

(56) References Cited

U.S. PATENT DOCUMENTS 6,213,413 B1 * 4/2001 Kojima .............. F02M 51/0667
                                                      239/533.11
6,755,360 B1 * 6/2004 Anderson .......... F02M 51/0671
                                                      239/533.7

FOREIGN PATENT DOCUMENTS

JP    H11-182377      7/1999
JP    2002-227742     8/2002
WO    WO2012046571  * 4/2012

* cited by examiner

*Primary Examiner* — Christopher Kim
(74) *Attorney, Agent, or Firm* — Vierra Magen Marcus LLP

(57) ABSTRACT

In a fuel injector, a first surface 39 of a valve seat 38 and a second surface 31 of a valve 26 are facing each other. In the first surface or the second surface, a seal member 32 disposed between the valve seat and the valve is provided. One of the first surface and second surfaces includes a protruding portion 31a that protrudes toward the other surface, and the protruding portion contacts a contact portion 39a of the other surface. The surface hardness of the protruding portion 31a disposed on either of the first surface and second surface is lower than that of the contact portion 39a of the other surface.

5 Claims, 7 Drawing Sheets

FUEL INJECTOR

CROSS-REFERENCE TO RELATED APPLICATION

This application claims priority to Japanese Patent Application No. 2013-247264 filed on Nov. 29, 2013, the contents of which are hereby incorporated by reference into the present application.

TECHNICAL FIELD

The present teachings relate to a fuel injector.

DESCRIPTION OF RELATED ART

A fuel injector that injects fuel is disclosed in Japanese Patent Application Publication No. 2002-227742. The fuel injector includes a valve seat having a fuel injection hole and a valve for opening and closing the fuel injection hole of the valve seat. In this fuel injector, an elastic member made of rubber and the like is fixed to a surface of the valve on a valve seat side for enhancement of fuel sealing property when the valve is closed, In addition, an annular protrusion piece is further provided with the valve and surrounds a periphery of the elastic member. When the valve is closed, the elastic member of the valve contacts the valve seat to close the fuel injection hole so as to prevent the fuel from flowing out from the fuel injection hole. Before the elastic member being deteriorated, the protrusion piece of the valve does not contact a receiving portion of the valve seat, but only the elastic member contacts the valve seat. On the other hand, if elastic force of the elastic member is lowered because of its deterioration, the protrusion piece of the valve contacts the receiving portion of the valve seat to limit further deformation of the elastic member. As a result, the deterioration of the elastic member can be delayed and the fuel sealing property can be supposedly maintained for a long period of time.

BRIEF SUMMARY

In a fuel injector of the above-mentioned kind, the protrusion piece (metal) of the valve contacts the receiving portion (metal) of the valve seat when the elastic member is deteriorated. Because the protrusion piece and the receiving portion have both metal surfaces, there is a problem of worn-out occurring on their surfaces if they repeatedly collide with each other. In conventional fuel injectors, the worn-out of the valve and the valve seat is therefore usually attempted to be prevented by executing a surface hardening treatment such as carburization, nitriding or carbonitriding treatment on both the valve and the valve seat. However, the surface hardening treatment on both the valve and the valve seat cannot adequately suppress the worn-out of the valve and the valve seat. The object of the present teaching disclosed herein is to provide a technique that can further suppress the worn-out on the valve and the valve seat.

A fuel injector disclosed herein comprises a valve seat having a fuel injection hole and a valve configured to move between a first position and a second position, wherein the valve closes off the injection hole when the valve is in the first position and the valve opens the fuel injection hole when the valve is in the second position. The valve seat includes a first surface facing the valve. The valve includes a second surface facing the first surface of the valve seat. One of the valve seat and the valve includes a seal member attached to the first surface or the second surface, the seal member being disposed between the valve seat and the valve. One of the first surface and second surfaces includes a first portion and a protruding portion protruding toward the other of the first and second surfaces relative to the first portion. The other of the first surface and second surfaces includes a contact portion and a noncontact portion, the contact portion being configured to contact the protruding portion, and the noncontact portion being configured to be noncontact with the protruding portion. The contact portion and the noncontact portion are disposed on a same plane. When the valve is in the first position, the seal member contacts both of the valve and the valve seat around the fuel injection hole and seals a clearance between the valve and the valve seat, and the contact portion contacts the protruding portion. When the valve is in the second position, the seal member separates from the other of the valve seat and the valve, and the contact portion separates from the protruding portion. Surface hardness of the protruding portion is lower than surface hardness of the contact portion.

As a result of an intensive study by the inventor of the present teaching, it was found that the worn-out of the first surface and the second surface can be suppressed by decreasing the surface hardness of the protruding portion than that of the contact portion, as compared to a case in which the surface hardness of both the protruding portion and the contact portion are increased, or a case in which the surface hardness of the protruding portion is increased than that of the contact portion. In the above-mentioned fuel injector, the surface hardness of the protruding portion formed on one of the surfaces is lower than the surface hardness of the contact portion formed on the other surface. Consequently, the fuel injector according to the present teachings can desirably control the worn-out of the first and second surfaces.

BRIEF DESCRIPTION OF DRAWINGS

FIG. 5A is a view of a case in which the surface hardness of the valve is higher than that of the valve seat, and FIG. 5B is a view of a case in which the surface hardness of the valve is lower than that of the valve seat;

DETAILED DESCRIPTION OF EMBODIMENTS

Figure 1:
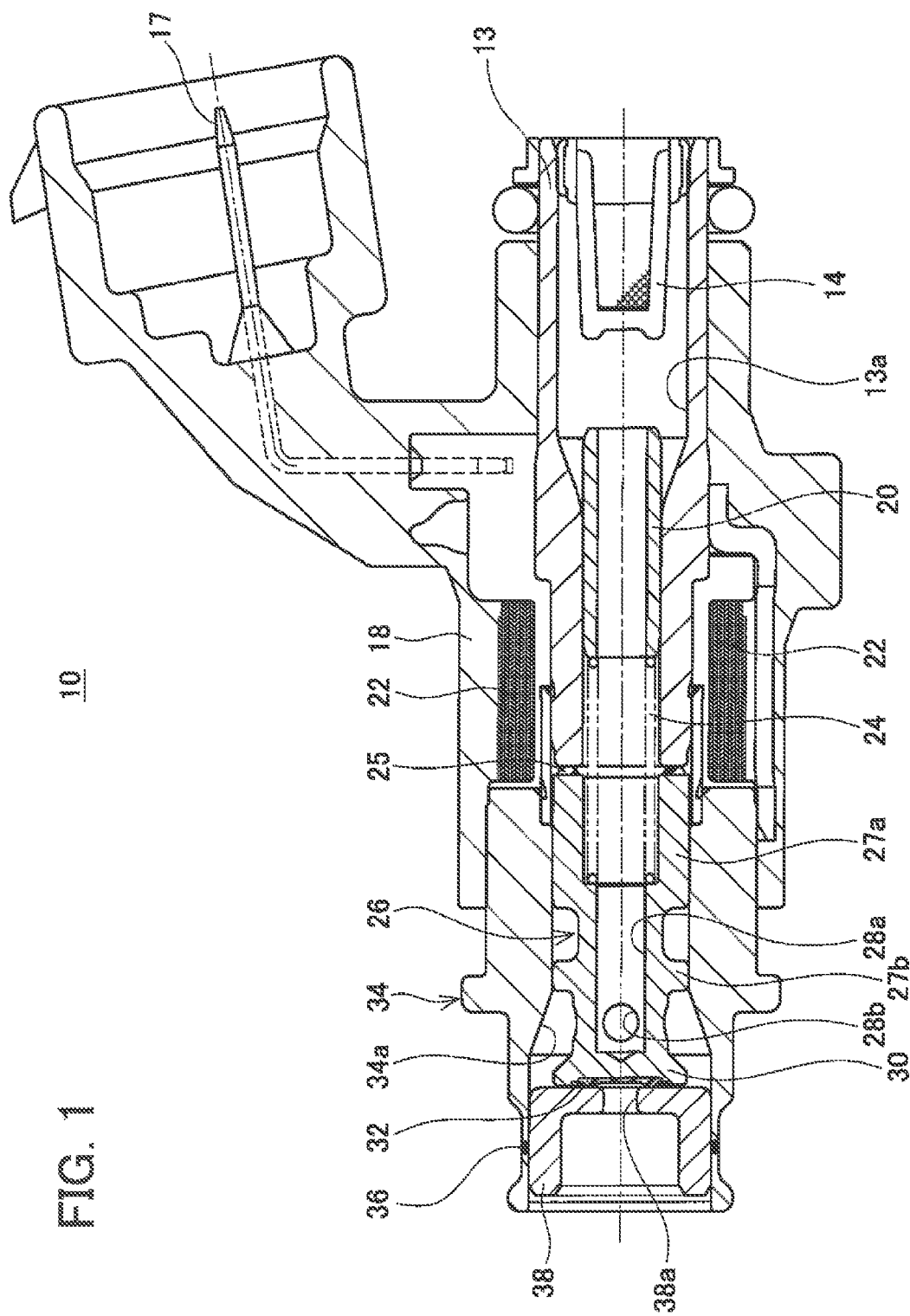
FIG. 1 is a sectional view that illustrates a configuration of a fuel injector.

Hereinbelow, some of the features of the present teachings disclosed herein will be described. In the fuel injector disclosed herein, the second surface of the valve may include the protruding portion and the first surface of the valve seat may include the contact portion. In this case, the valve may be made of electromagnetic stainless steel and the valve seat may be made of stainless steel. Since the surface hardness of the electromagnetic stainless steel is lower than that of the stainless steel, the surface hardness of the protruding portion can be easily decreased more than that of the contact portion simply by changing materials of the valve and the valve seat.

In the fuel injector disclosed herein, the valve seat may be made of hardened stainless steel. In such a configuration, the surface hardness of the first surface of the valve seat can be increased so that the worn-out of the first surface of the valve seat can be suppressed.

The fuel injector disclosed herein may further comprise a movable armature fixed to the valve, a body having a fuel path, wherein the valve seat is attached to a downstream side of the body, and a core having a fuel path, the core being disposed at an upstream side of the armature with a clearance. In this case, the valve and the armature may be disposed within the body and between the valve seat and the core and the valve may be disposed at the downstream side of the body and the armature is disposed at the upstream side of the body. A sliding surface, which contacts and slides relative to the body, includes a surface hardened layer exposed at the sliding surface. An end surface of the armature on a core side does not have a surface hardened layer, and a raw material of the armature is exposed at the end surface. In such a configuration, because the surface hardened layer is formed on the sliding surface of the movable armature, sliding characteristics relative to the body (for example, worn-out resistance and lubricity) can be enhanced. Moreover, since the surface hardened layer is not formed on the end face on the core side of the movable armature, shape accuracy of the movable armature can be enhanced regardless of various thicknesses of the surface hardened layer. Furthermore, as a nonmagnetic length between the movable armature and the core can be shortened, a force for attracting the movable armature to the core side can be enhanced.

The fuel injector disclosed herein may further comprise a rubber member disposed between the movable armature and the core. In this case, a cross sectional shape of the rubber seen on a plane including an axial line of the fuel injector may be a polygonal shape, and one of vertices of the polygonal shape may project toward the armature of the core. In such a configuration, since the rubber member is disposed between the movable armature and the core, generation of collision noise between the movable armature and the core can be suppressed. In addition, the rubber member is formed in the polygonal shape with its apex having a maximum height. Therefore, stress generated in the rubber member when the movable armature is attracted to the core can be suppressed, thus, enhancing a durability of the rubber member.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved fuel injectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

A fuel injector 10 according to the present embodiment is explained below. As shown in FIG. 1, the fuel injector 10 includes a main body (an example of a core) 13, a valve 26, a body 34 and a valve seat member 38.

The main body 13 is a cylindrically shaped member and has a fuel path 13a penetrating in an axial direction thereof. A fuel piping (not shown) is connected to an upstream end. (right end in FIG. 1) of the main body 13. Fuel flowing in the fuel piping enters into the fuel path 13a of the main body 13 and the fuel flows through the fuel path 13a. The main body 13 is made of a magnetic material. In the present embodiment, the main body 13 is made of electromagnetic stainless steel. A surface treatment layer is not formed on a surface of the main body 13. For this reason, the electromagnetic stainless steel is exposed on the surface of the main body 13, and a surface hardness thereof is 150 to 250 HV.

A filter 14 is attached to the upstream end of the main body 13. The filter 14 removes large foreign matter from the fuel entering into the fuel path 13a from the fuel piping. An adjuster 20 is pressed into an intermediate portion of the fuel path 13a of the main body 13. The adjuster 20 supports the upstream end of a spring 24. A valve 26 is disposed at a downstream side of the spring 24. The spring 24 energizes the valve 26 in a direction toward the valve seat member 38 (left direction in FIG. 1).

The valve 26 includes a valve body (27a, 27b) and a valve tip portion 30. The valve 26 is housed in a fuel path 34a of the body 34, and is slidably supported to the body 34. That means, the valve body (27a, 27b) includes a movable armature portion 27a disposed in an upstream side and a guide portion 27b disposed in a downstream side with a clearance between the movable armature portion 27a and the guide portion 27b. A side surface 29a of the movable armature portion 27a and a side surface 29b of the guide portion 27b slide relative to the body 34. Since the valve 26 is slidably supported by the body 34 at two locations, the valve 26 can reciprocate smoothly relative to the body 34.

The valve body (27a, 27b) is made of a magnetic material. In the present example, the valve body (27a, 27b) is made of the electromagnetic stainless steel. The upstream end of the valve body (27a, 27b) faces the downstream end of the main body 13. A rubber member 25 is fixed to the upstream end of the valve body (27a, 27b). The rubber member 25 can be made of, for example, a fluororubber. A coil 22 is provided with an external periphery of the upstream end of the valve body (27a, 27b) and of the downstream end of the main body 26.

The valve body (27a, 27b) supports the downstream end of the spring 24. When the valve 26 is positioned so as to close a fuel injection hole 38a of the valve seat member 38, the upstream end of the valve body (27a, 27b) is positioned so as to be away from the downstream end of the main body 13 for a predefined distance. A fuel channel 28a extending within the valve body (27a, 27b) from the upstream to the downstream is formed in the valve body (27a, 27b). Communication holes 28b are formed on a surface of the external periphery of the valve body (27a, 27b). The communication holes 28b vertically extend relative to the axial direction of the fuel channel 28a. The communication holes 28b communicate a space surrounded by the valve 26, the body 34, and the valve seat member 38 and the fuel channel 28a.

The downstream end (left end in FIG. 1) of the valve body (27a, 27b) is joined to the valve tip portion 30. The valve tip portion 32 is integrally formed with the valve body (27a, 27b). Therefore, the valve tip portion 32 is made of the same magnetic material (electromagnetic stainless steel in the present example) as the valve body (27a, 27b). A seal member 32 is fixed to the downstream end (left end in FIG. 1) of the valve tip portion 30.

The body 34 is a cylindrical member including the fuel path 34a penetrating in the axial direction. A coil 22 is disposed at the upstream end of the body 34 (right end in FIG. 1). The valve 26 is slidably housed in the fuel path 34a of the body 34. The valve seat member 38 is fixed to the downstream end (left end of FIG. 1) of the fuel path 34a of the body 34.

The valve seat member 38 is a member formed in a bottomed cylindrical shape. The valve seat member 38 is fixed inside the fuel path 34a of the body 34 so as to allow a bottom side of the valve seat member to be arranged inside the body 34. The fuel injection hole 38a is formed at the center of the valve seat member 38. The valve tip portion 30 contacts the upstream end (right end in FIG. 1) of the valve seat member 38. The fuel injection hole 38a of the valve seat member 38 is closed by the valve tip portion 30 contacting the valve seat member 38. The valve seat member 38 is made of hardened (quenching in the present example) stainless steel. For this reason, a surface hardness of the valve seat member 38 is assumed to be in a range of 500 to 600 HV.

Figure 4:
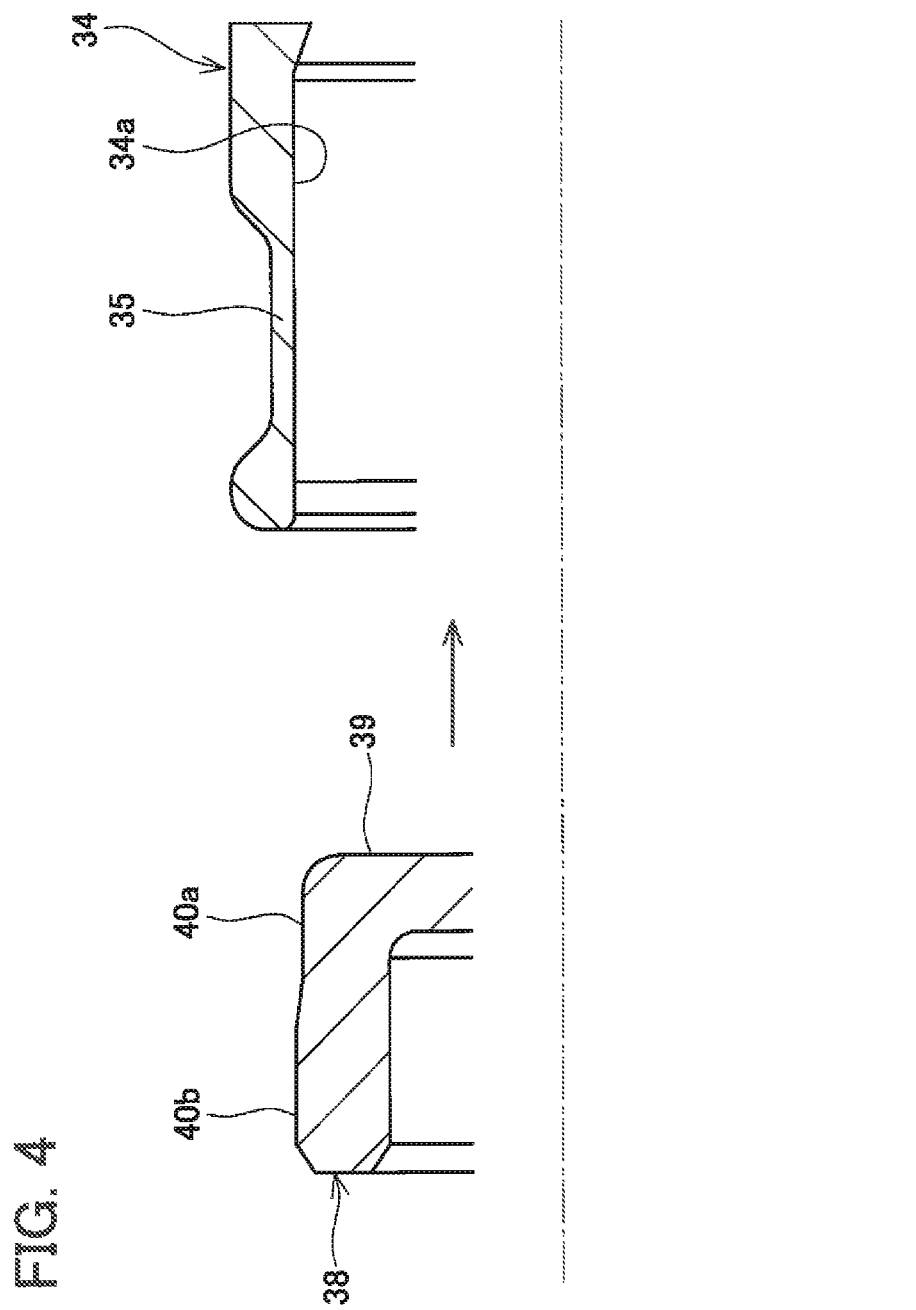
FIG. 4 is a view for explaining a method for fixing a valve seat to a seat.

In the present example, the valve seat member 38 is press-fitted in the fuel path 34a of the body 34, and is bonded to the body 34 by welding in that pressed-in portion. Specifically, as shown in FIG. 4, a thin portion 35 is formed in the vicinity the downstream end of the body 34 (left end in FIG. 4). The valve seat member 38 includes a large diameter press-in portion 40b and a narrow diameter portion 40a formed therein, the narrow diameter portion 40a having a diameter smaller than that of the press-in portion 40b. The diameter of the press-in portion 40b is slightly larger than that of the fuel path 34a. The diameter of the narrow diameter portion 40a is slightly smaller than that of the fuel path 34a. The valve seat member 38 is inserted into the fuel path 34a of the body 34 from the narrow diameter portion 40a. As the diameter of the narrow diameter portion 40a is smaller than that of the fuel path 34a, the valve seat member 38 can be easily inserted into the fuel path 34a. On the other hand, as the diameter of the press-in portion 40b is slightly larger than that of the fuel path 34a, the press-in portion 40b is pressed into the fuel. path 34a of the body 34 by pushing the valve seat member 38 into the fuel path 34a. As the body 34 includes a thin part 35 formed therein, when the valve seat member 38 is pressed in, the thin-walled portion 35 easily becomes deformed. For this reason, the deformation of the valve seat member 38 is controlled because the press-in load of the valve seat member 38 can be controlled at a low level. The pressed-in valve seat member 38 is welded to the body 34 in the thin-walled portion 35. As a welding area 36 (shown in FIG. 1) is considered to be the thin-walled portion 35, the thermal deformation of the valve seat member 38 at the time of welding can be controlled at a low level. Thereby, the body 34 and the valve seat member 38 can be firmly fixed while suppressing the deformation of the valve seat member 38.

A main body supporting portion 18 made of resin is formed on the outside of the main body 13, coil 22, and the body 34. The main body supporting member 18 includes a connector 17 for connecting an external power source (not shown), the connector 17 disposed on the peripheral face of the main body supporting member 18. The connector 17 supplies the power inputted from the external power source to the coil 22.

Figure 2:
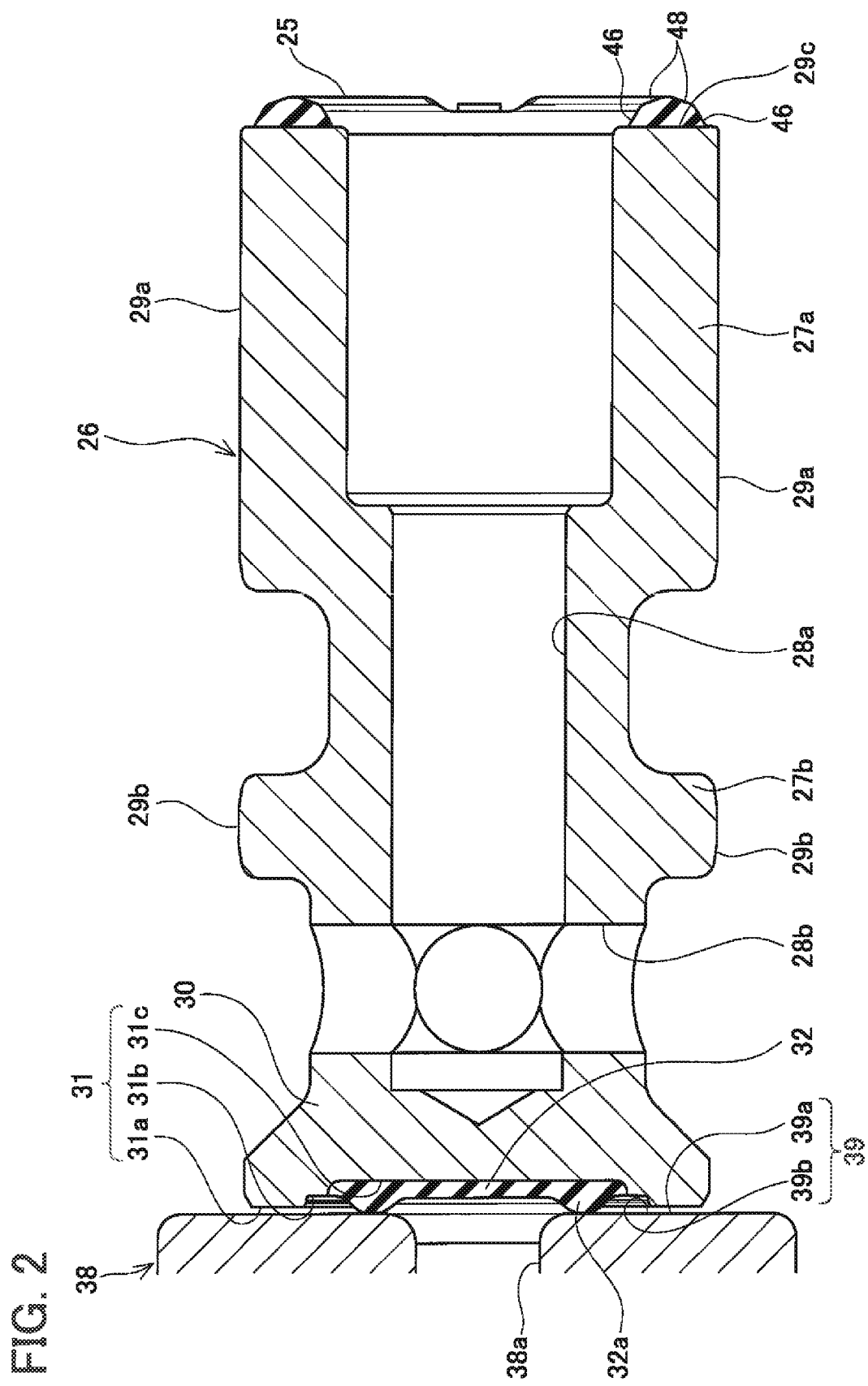
FIG. 2 is a view that illustrates a principal part of the fuel injector.

Next, the configuration of the valve tip portion 30 on the valve 26 is explained in detail. As shown in FIG. 2, a surface 31 (an example of second surfaces) facing the valve seat member 38 is formed at the downstream end (left end in the FIG. 2) of the valve tip portion 30. The surface 31 includes a recessed portion 31c, a protruding portion 31a (an example of protruding portions), and an intermediate portion 31b (an example of the first portions) disposed between the recessed portion 31c and the protruding portion 31a.

The recessed portion 31c is positioned at the center of the surface 31, with a seal. member fixed thereto. The seal member 32, for example, is made of fluororubber. The seal member 32 includes an annular protrusion 32a. The protrusion 32a has a diameter larger than the outer diameter of the fuel injection hole 38a on the valve seat member 38. The protrusion 32a is disposed on the same axis as the fuel injection hole 38a.

The protruding portion 31a is formed on the outside of the seal member 32. The protruding portion 31a is protruding from the intermediate portion 31b and heading for the valve seat member 38 side, however, it is not protruding from the protrusion 32a of the seal member 32. The protruding portion 31a is annularly protruding and enclosing the periphery of the protrusion 32a. The protruding portion 31 a is disposed on the same axis of the fuel injection hole 38a and the protrusion 32a.

On the other hand, a surface 39 (an example of first surfaces) that faces the surface 31 of the valve is formed at the upstream end (right end in FIG. 2) of the valve seat member 38. The surface 39 includes a contact portion 39a that contacts the protruding portion 31a of the valve 26, and a noncontact portion 39b that does not contact the protruding portion 31a. The contact portion 39a and the noncontact portion 39b form the same plane surface. The noncontact portion 39b placed inside the contact portion 39a is contacted by the protrusion 32a of the seal member 32.

Here, since a surface hardened layer is not formed on the surface 31 of the valve 26, the raw material of the valve 26 (i.e., electromagnetic stainless steel) is being exposed. Therefore, the surface hardness of the surface 31 of the valve 26 is assumed to be in a range of 150 to 250 HV. As described above, the valve seat member 38 is made of hardened stainless steel. For this reason, the surface hardness of the surface 31 (protruding portion 31a) of the valve 26 is lower than that of the surface 39 (contact portion 39a) of the valve seat member 38.

Figure 3:
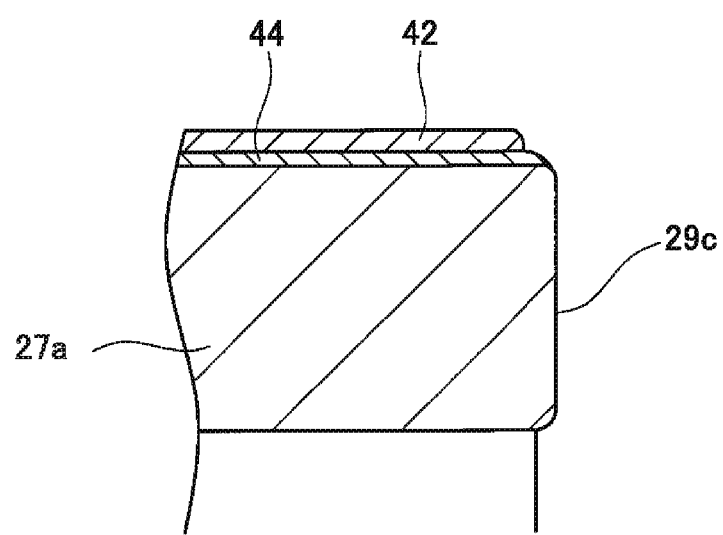
FIG. 3 is a sectional view that illustrates an enlarged principal part of a movable armature.

On the other hand, a surface hardened layer is formed on the side surface 29a of the movable armature portion 27a of the valve 26, and on the side surface 29b of the guide portion 27b. That means, as shown in FIG. 3, a nitride layer 44 is formed on the side surface 29a of the movable armature portion 27a, and a DLC (diamond like carbon) layer 42 is formed on the nitride layer 44. The formation of the DLC layer 42 on the side surface 29a of the movable armature portion 27a can enhance the sliding characteristics with the body 34. In addition, the DLC layer 42 increases the surface hardness which also can enhance the worn-out resistance of sliding portions. The same surface hardened layer formed on the side surface 29a of the movable armature portion 27a is also formed on the side surface 29b of the guide portion 27b.

Since a surface hardened layer is also not formed on an end surface 29c at the downstream side of the valve 26 (downstream end of the movable armature portion 27a), the raw material of the valve 26 (i.e., electromagnetic stainless steel) is being exposed. As no surface hardened layer is formed on the end surface 29c, there is no problem of the various thickness of the surface hardened layer. Therefore, the dimensional accuracy of the movable armature portion 27a can be enhanced. Moreover, the nonmagnetic length between the movable armature portion 27a and the main body 13 can be shortened by the length where the surface hardened layer is not formed, which can increase the force for attracting the valve 26 toward the main body 13. To form a surface hardened layer only on a desired portion of the valve 26, the surface hardening treatment should be conducted with the portion, where the layer is not to be formed, kept masked.

As shown in FIG. 2, a rubber member 25, fixed to the end surface 29c at the downstream side of the valve 26, has a cross sectional shape (i.e., a cross sectional shape into which the rubber member 25 is cut by a plane surface including the axis of the fuel injector 10) formed in a polygonal shape with a vertex thereof having the maximum height. That is, the cross sectional profile of the rubber member 25 is formed by a pair of first straight portions 46 extending from the end surface 29c, and by a pair of second straight portions 48 extending from the tip of the first straight portions 46. The pair of second straight portions 48 is connected with each other and forming a polygonal vertex, thus in other words protruding toward the main body 13. The angle formed by the first straight portion 46 and the end surface 29c is larger than that formed by the second straight portion 48 and the end surface 29c.

Next, the operation of the fuel injector 10 is explained below. Fuel enters into the main body 13 of the fuel injector 10 from a fuel piping (not shown). The fuel entering into the fuel path 13a of the main body 13 reaches the fuel channel 28a of the valve 26 through the adjuster 20. The fuel in the fuel channel 28a passes through the communication holes 28b, and enters in a space enclosed by the valve 26, body 34, and the valve seat member 38. When the valve 26 is placed at the closing position, the fuel injection hole 38a of the valve seat member 38 is sealed by the valve tip portion 30 and the rubber member 34. That is, the valve 26 is energized by a spring 24 and contacts a surface 39 of the valve seat member 38. In this state, the rubber member 34 contacts a noncontact portion 39b of the surface 39 and seals the periphery of the fuel injection hole 38a. In addition, the protruding portion 31 a of the valve tip portion 30 contacts a contact portion 39a of the surface 39 outside the rubber member 34, and seals a place between the surface 39 of the valve seat member 38 and the surface 31 of the valve 26. Thereby, the fuel supplied to the tip of the body 34 is retained in the body 34.

As shown in FIG. 1, if an electric power is supplied to the coil 22 from an external power source through the connector 17 with the valve 26 placed at the closing position, a magnetic flux is generated from the coil 22 which attracts the valve 26 toward the main body 13. When the valve 26 moves toward the main body 13, firstly, the protruding portion 31a of the valve tip portion 30 separates from the valve seat member 38. When the valve 26 further moves toward the main body 13 following to the separation of the protruding portion 31a, a protrusion 32a of the seal member 32 separates from the valve seat member 38. From this state, the valve 26 (specifically, a rubber member 25) further moves to the position where it contacts the downstream end (left end in FIG. 1) of the main body 13 (i.e., the closing position). When the protrusion 32a of the seal member 32 separates from the valve seat member 38, the fuel supplied to the downstream end of the body 34 is injected from the fuel injection hole 38a after passing through between the surface 39 of the valve seat member 38 and the surface 31 of the valve 26. If the electric power supplied from the external power source is stopped, the valve 26 moves from the opening position to the closing position by the energizing force of the spring 24.

As is clear from the explanation above, if the valve 26 repeatedly moves between the opening position and the closing position, the rubber member 34 and the protruding portion 31 a of the valve tip portion 30 repeatedly collide with the surface 39 of the valve seat member 38. Since the valve seat member 38 and the protruding portion 31a of the valve tip portion 30 are both made of metal, the worn-out of these contact surfaces becomes a problem. In the fuel injector 10 of the example, the surface hardness of the protruding portion 31a. is designed to be lower than that of the surface 39 of the valve seat member 38. For this reason, as shown in FIG. 5B, the worn-out of the protruding portion 31a of the valve tip portion 30, and that of the surface 39 of the valve seat member 38 can be controlled. The worn-out powder generated by the worn-out of the protruding portion 31a is removed quickly from the area between the protruding portion 31a and the surface 39 by the flow of the fuel. As a result, the worn-out of the contact surfaces can be controlled.

Figure 5A:
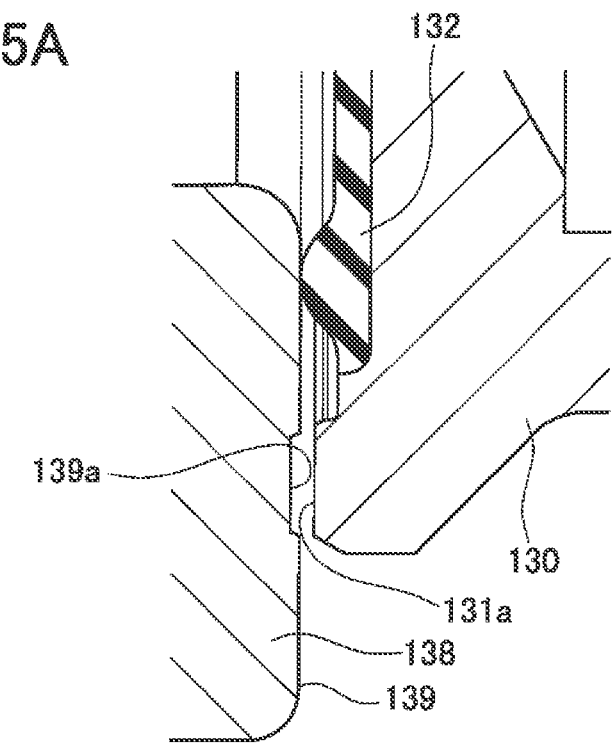
FIGS. 5A and 5B are views that explain the operation of the fuel injector.
Figure 5B:
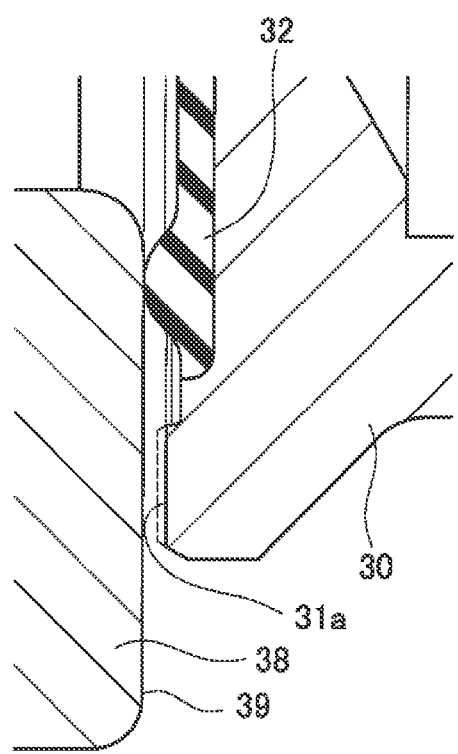

On the other hand, as shown in FIG. 5A, if the surface hardness of the protruding portion 131a is higher than or equal to that of the surface 139 of the valve seat member 138, the surface 139 of the valve seat member 138 wears out. As a result, an abraded groove 139a is formed on the surface 139. The worn-out powder in the abraded groove 139a is difficult to be removed by the flow of fuel, the powder is accumulated in the abraded groove 139a. For this reason, the worn-out powder accumulated in the abraded groove 139a further progresses the worn-out of the surface 139.

As described above, in the fuel injector 10 of the example, the progress of worn-out in the valve seat member 38 and the valve tip portion 30 can be controlled. For this reason, the increase of the distance for moving the valve 26 from the opening position to the closing position (i.e., amount of stroke) with the time passage can be suppressed, and the increase of the fuel flow when moving the valve 26 to the closing position can be suppressed. In addition, as the increase in the amount of stroke for the valve 26 is suppressed, the prolonged response time for opening the valve can be controlled, and the characteristic change of the fuel injector 10 can be suppressed.

If the valve 26 moves to the closing position, the rubber member 25 provided on the upstream end surface 29c of the valve 26 collide with the downstream end surface of the main body 13. As the rubber member 25 is disposed between the valve 26 and the main body 13, the collision noise generated when moving the valve 26 to the closing position can be controlled. In addition, the cross section of the rubber member 25 is formed in a polygonal shape with the apex being the maximum height. Therefore, the stress generated in the rubber member 25 can be controlled at a low level, thus, being able to enhance the durability of the rubber member 25. That means, the stress generated in the rubber member 25 becomes high in the vicinity of the connection portion between the first straight portion 46 and the end surface 29c and between the first straight portion 46 and the second straight portion 48 (see FIG. 2). With the increase of high stress portions, the maximum stress generated in the rubber member 25 can be lowered, being able to enhance the durability of the rubber member 25.

Specific examples of the present teachings have been described in detail, however, these are mere exemplary indications and thus do not limit the scope of the claims. The art described in the claims include modifications and variations of the specific examples presented above.

Figure 6:
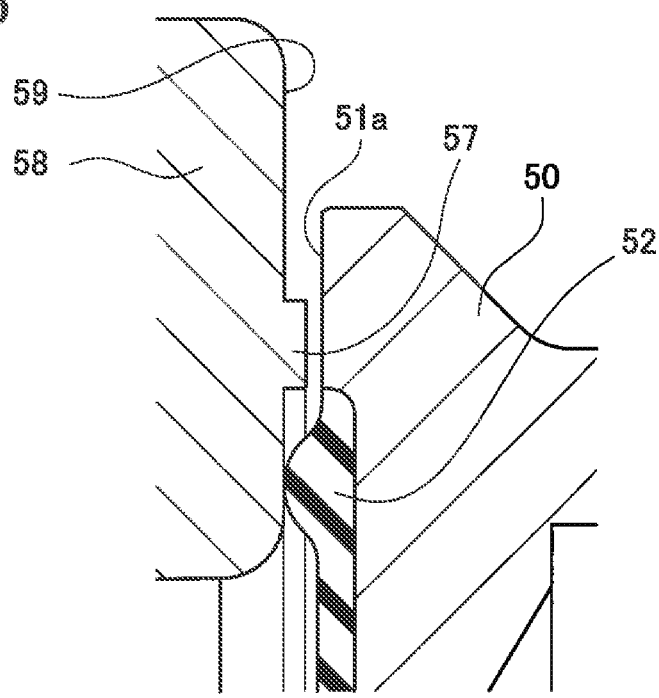
FIG. 6 is a view that illustrates a principal part of the fuel injector according to a modified example.
Figure 7:
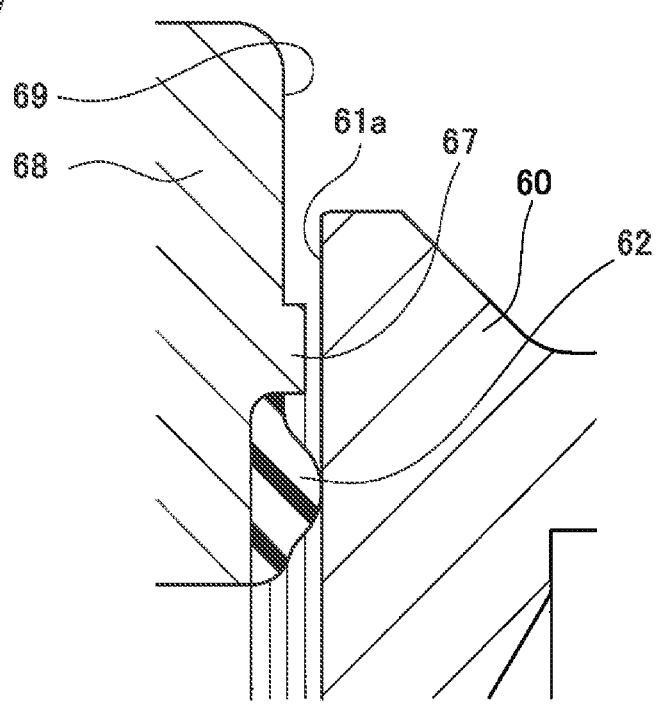
FIG. 7 is a view that illustrates a principal part of the fuel injector according to a modified example.
Figure 8:
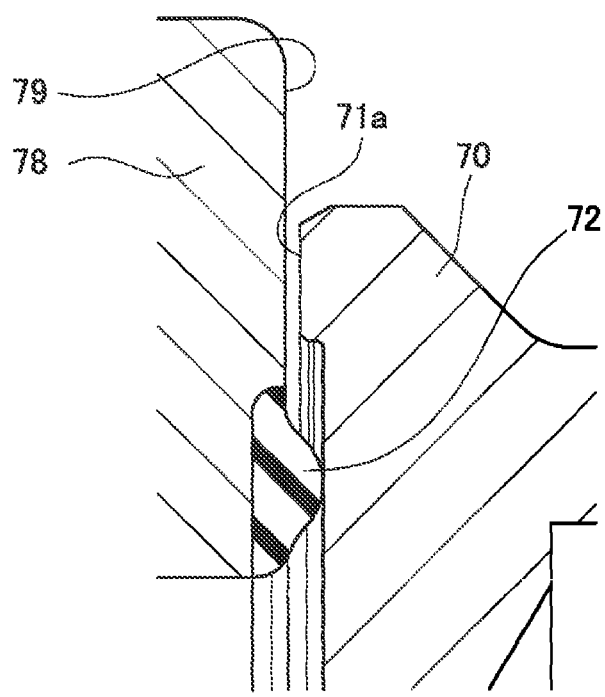
FIG. 8 is a view that illustrates a principal part of the fuel injector according to a modified example.

For example, the seal member 32 and the protruding portion 31a are provided on the valve 26 in the above example, however, the examples are not limited to this. For example, as shown in FIG. 6, the protruding portion 57 may be formed on the surface 59 of the valve seat member 58, and the surface 51a may be formed so as to allow the protruding portion 57 to contact the valve tip portion 50. In this case, the worn-out of contacting portions can be controlled by making the surface hardness of the protruding portion 57 lower than that of the surface 51a. Moreover, as shown in FIG. 7, a seal member 62 may be provided on the valve seat member 68 side. In this case also, the surface 61a of the valve tip portion 60 can be formed in a plane surface. Furthermore, as shown in FIG. 8, the protruding portion 71a may be formed on the valve tip portion 70 while providing the seal member 72 on the valve seat member 78. In the above example: the recessed portion 31c to which the seal member 32 is fixed, the protruding portion 31a that contacts the valve seat member 38, and the intermediate portion 31b placed between the recessed portion 31c and the protruding portion 31a are formed in the surface 31 of the valve tip portion 30, however, the technique disclosed herein is not limited to such an example. For example, the protruding portion 31a may be formed adjacent to the recessed portion 31c without forming an intermediate portion 31b between the protruding portion 31a and the recessed portion 31c.

What is claimed is:

1. A fuel injector, comprising:
a valve seat having a fuel injection hole;
a body have a fuel path, wherein the valve seat is attached to a downstream side of the body;
a valve;
a movable armature provided in the valve; and
a core having a fuel path, the core being disposed at an upstream side of the armature with a clearance, wherein
the valve seat includes a first surface facing the valve,
the valve includes a second surface facing the first surface of the valve seat,
one of the valve seat and the valve includes a seal member attached to the first surface or the second surface, the seal member being disposed between the valve seat and the valve,
one of the first and second surfaces includes a first portion and a protruding portion protruding toward the other of the first and second surfaces relative to the first portion,
the other of the first and second surfaces includes a contact portion and a noncontact portion, the contact portion being configured to contact the protruding portion, the noncontact portion being configured to be noncontact with the protruding portion, and the contact portion and the noncontact portion being disposed on a same plane,
when the valve is in the first position, the seal member contacts both of the valve seat and the valve around the fuel injection hole and seals a clearance between the valve and the valve seat, and the contact portion contacts the protruding portion,
when the valve is in the second position, the seal member separates from the other of the valve seat and the valve, and the contact portion separates from the protruding portion, and
surface hardness of the protruding portion is lower than surface hardness of the contact portion,
the valve and the armature are disposed within the body and between the valve seat and the core,
the valve is disposed at the downstream side of the body and the armature is disposed at the upstream side of the body,
a sliding surface of the armature, which contacts and slides relative to the body, includes a surface hardened layer exposed at the sliding surface, and
an end surface of the armature on a core side does not have a surface hardened layer, and a raw material of the armature is exposed at the end surface,
the surface hardened layer of the sliding surface comprises a nitride layer and a diamond like carbon layer disposed on the nitride layer.

2. The fuel injector as in claim 1, wherein a material of the protruding portion is different from a material of the contact portion.

3. The fuel injector as in claim 2, wherein
the second surface of the valve includes the protruding portion,
the first surface of the valve seat includes the contact portion, and
the valve is made of electromagnetic stainless steel and the valve seat is made of stainless steel.

4. The fuel injector as in claim 3, wherein the valve seat is made of hardened stainless steel.

5. The fuel injector in claim 1, further comprising:
a rubber member disposed between the armature and the core,
wherein a cross sectional shape of the rubber member seen on a plane including an axial line of the fuel injector is a polygonal shape, and
one of vertices of the polygonal shape projects toward the armature or the core.

* * * * *

UNITED STATES PATENT AND TRADEMARK OFFICE
CERTIFICATE OF CORRECTION

PATENT NO.        : 9,441,589 B2
APPLICATION NO.   : 14/554533
DATED             : September 13, 2016
INVENTOR(S)       : Kawazoe It is certified that error appears in the above-identified patent and that said Letters Patent is hereby corrected as shown below:

In the Claims

Column 9, Line 7, Claim 1: After "body" and before "a" delete "have" and replace with -- having --.

Signed and Sealed this
Third Day of January, 2017

Michelle K. Lee
*Director of the United States Patent and Trademark Office*